L. W. KILE.
METAL CUTTING APPARATUS.
APPLICATION FILED NOV. 4, 1912.
1,244,744.
Patented Oct. 30, 1917.
2 SHEETS—SHEET 2.
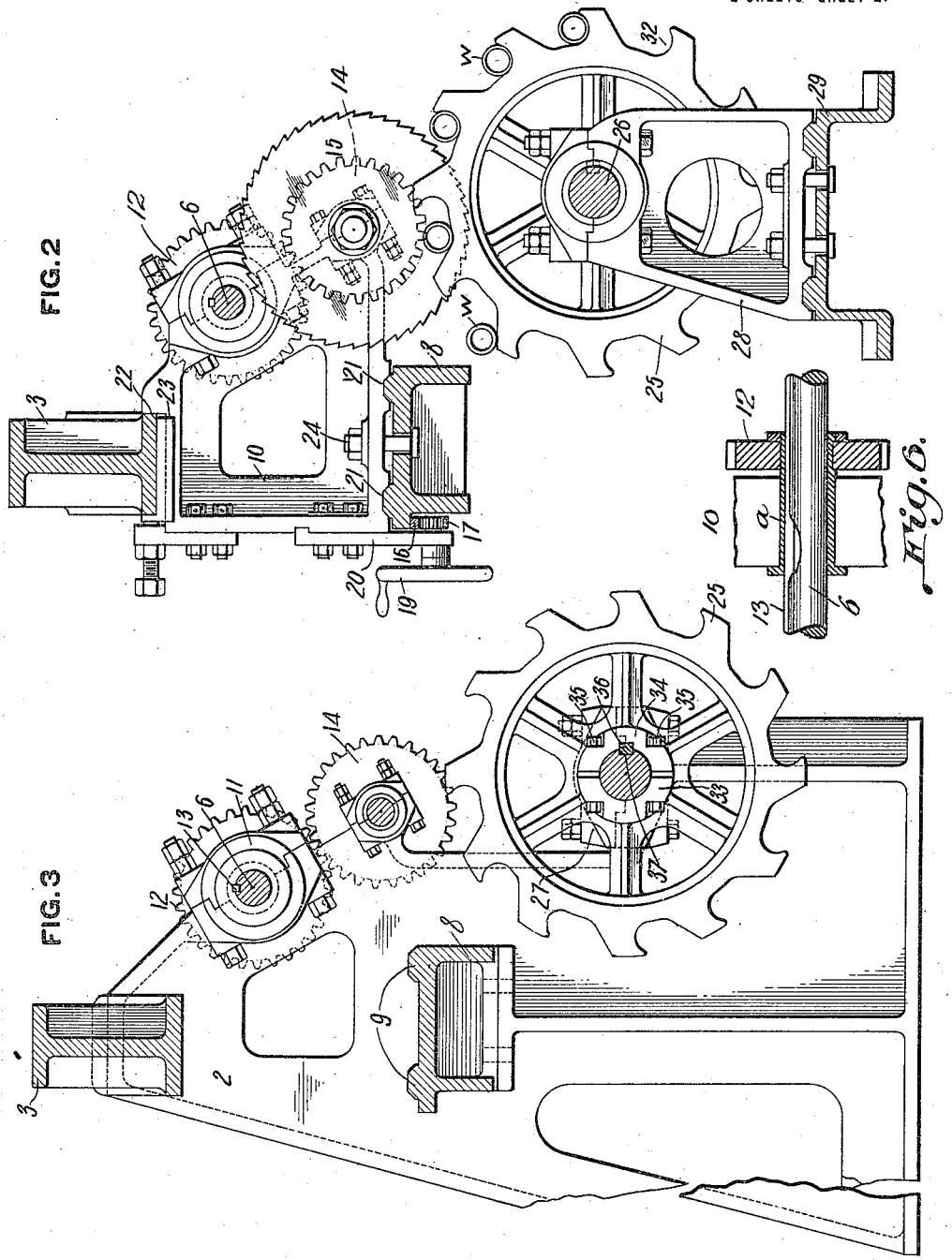
WITNESSES
INVENTOR

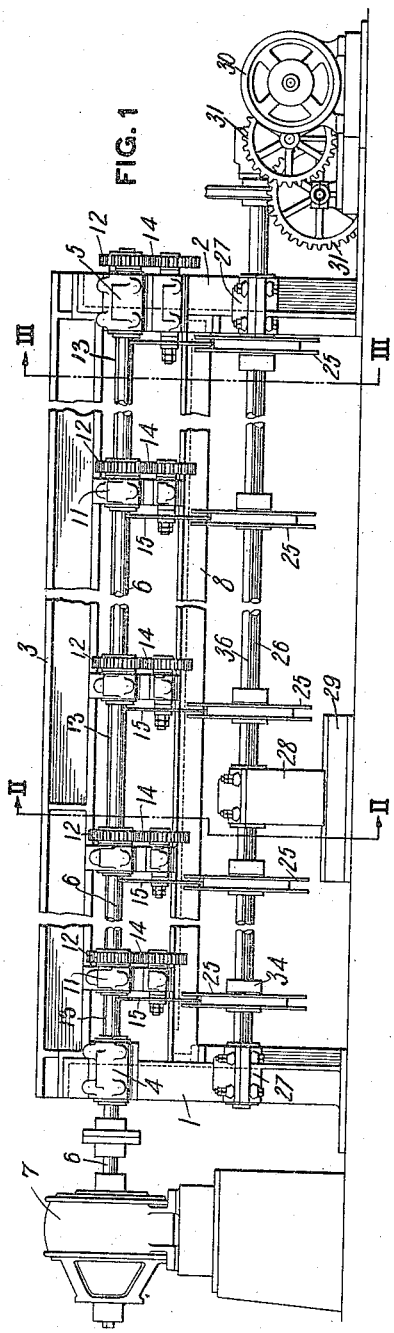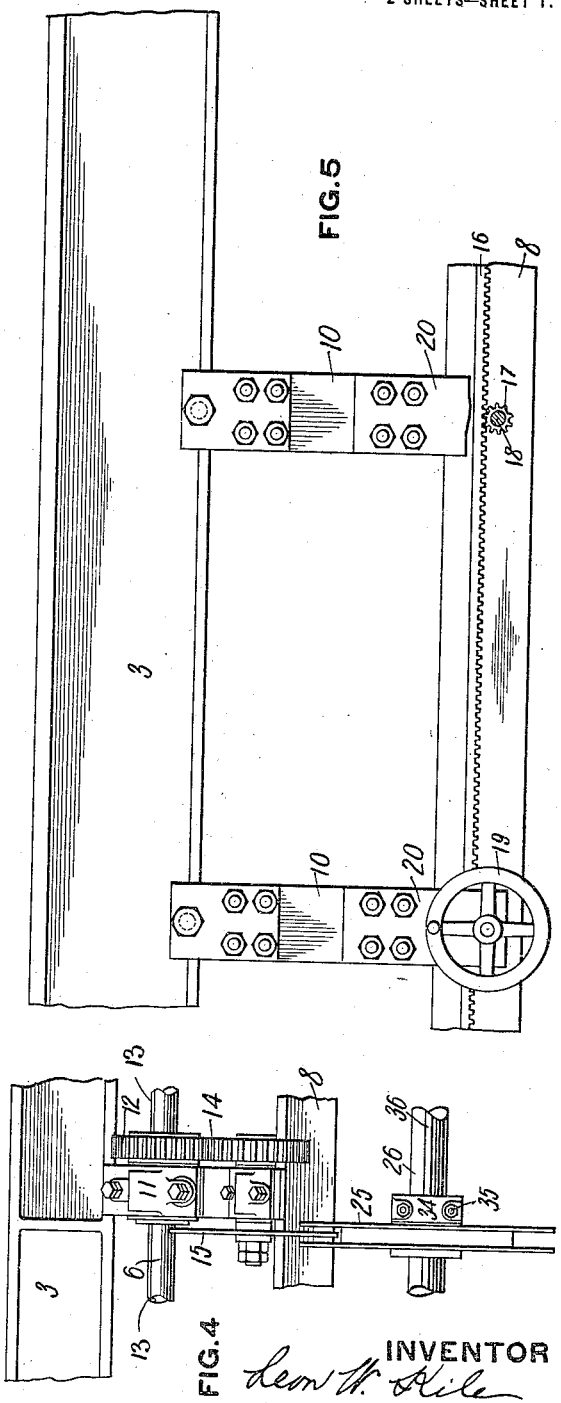

UNITED STATES PATENT OFFICE.

LEON W. KILE, OF STRUTHERS, OHIO.

METAL-CUTTING APPARATUS.

1,244,744.   Specification of Letters Patent.   Patented Oct. 30, 1917.

Application filed November 4, 1912. Serial No. 729,356.

*To all whom it may concern:*

Be it known that I, LEON W. KILE, of Struthers, in the county of Mahoning and State of Ohio, have invented certain new and useful Improvements in Metal-Cutting Apparatus, of which the following is a specification.

The prime object of the present invention is to provide a new and improved metal cutting apparatus designed for sawing pipes, tubes, and other articles into any desired lengths.

In the accompanying drawings, which illustrate an application of my invention, Figure 1 is a front elevational view of an apparatus embodying my invention; Fig. 2, a vertical sectional view, the section being taken on line II—II of Fig. 1; Fig. 3, a view similar to Fig. 2, the section being taken on line III—III of Fig. 1; Fig. 4, an enlarged detail front elevational view of a portion of the mechanism; Fig. 5, a rear elevational view of a portion of the apparatus, particularly showing means for laterally adjusting the saw and gear carrying brackets; and Fig. 6, a detail sectional view, partly in elevation, showing drive connections for a saw unit.

Referring to the drawings, the housing of the apparatus comprises two vertically extending upright members 1 and 2 connected at their upper rear portions by a horizontally disposed beam 3.

Extending longitudinally of the apparatus and supported in suitable bearings 4 and 5 located on the respective end portions 1 and 2, I provide a drive shaft 6. This shaft 6, as illustrated, is coupled up with a motor 7 by which said shaft is driven.

Located below the shaft 6 and to the rear thereof, and extending throughout the width of the apparatus, I provide a longitudinally extending beam 8, said beam being supported by the ends 1 and 2 of the housing. Beam 8 is preferably of channel form in cross section, and is provided with upwardly extending projections or flanges 9 designed to constitute a track on which a series of brackets 10 are mounted.

The brackets 10, which form a support for the shaft 6, correspond in number to the number of saws which are adapted to be operated, each bracket providing a support for its individual saw and the drive connections thereto leading from the shaft 6. As shown in the drawings, each bracket is formed with a divided bearing in which is located a sleeve $a$. Each sleeve is mounted on the shaft 6 in a manner to be driven thereby, the shaft being provided with a key 13 preferably extending throughout the length of the shaft, the inner face of the sleeve being formed complemental to the shaft and the key. The sleeve $a$ extends beyond the bracket and carries a gear 12 secured to the sleeve, the gear being secured to the sleeve in a suitable manner. Each gear 12 is adapted to mesh with a gear 14 carried by a stub shaft mounted in bearings formed on the bracket 10, said stub shaft carrying the saw 15. By this arrangement, it will be seen that rotation of the shaft 6 causes the sleeve $a$ to be rotated, said sleeve acting to rotate gear 12, and through its gear connection with gear 14 provide rotation to the saw 15. As will be readily understood, each bracket 10, with the parts referred to, constitutes a cutting unit, all of the units being driven by the single shaft 6.

Brackets 10, together with the gears 12 and 14 and the cutting saw carried by the respective brackets, are adapted to be shifted laterally of the apparatus for the purpose of positioning the respective cutting saws to enable various lengths of pipe, etc., to be cut.

For the purpose of shifting said brackets 10 into the desired operative positions, I provide a rack bar 16 and a pinion 17 carried on an end of a hand operated shaft 18. 19 designates the operating wheel for revolving shaft 18, and said shaft 18 is connected with the respective brackets 10 by means of plates 20. Each of the brackets 10 is provided with grooves 21 adapted to receive the upwardly extending flanges 9 of member 8 on which the brackets are mounted. The upper ends of the respective brackets 10 are provided with a groove 22 for the purpose of receiving a filler piece 23 interposed between the lower wall of the groove and the beam 3.

As will be readily understood, the adjustment of each unit lengthwise of the member 8 may be provided by operating the wheel 19 which causes the bracket to be moved on the member 8, such movement carrying the operating connections by reason of the slidable connection of sleeve $a$ with the shaft 6.

24 designates a bolt passed through an aperture in beam 8 and through an opening in the base of the bracket, said bolt being designed to rigidly connect the bracket to the beam 8 after it has been moved into the desired position.

The means for carrying the pipes, tubes, etc., into positions to be operated upon by the respective saws comprise a series of rotatable work carrying members 25 adjustably mounted on a driving shaft 26, the latter having its ends supported in suitable bearings 27 in the respective end portions 1 and 2 of the housing, and in an adjustable bearing 28 disposed intermediate of the ends 1 and 2 and on a support 29. Shaft 26 is driven by a motor 30 and intermediate gear mechanism 31.

The rotatable work carrying members 25, in the form illustrated, comprise a series of wheels having spaced peripheral portions, each formed with work containing pockets 32. As will be seen in Fig. 2, the members 25 form supports for the work which retain the latter against a yielding action during the sawing operation. 33 designates a hub of the respective wheels, and 34 a cap secured to the hub by means of bolts 35. The respective caps 34 of each member 25 are provided with a key 36 adapted to be entered in a key-way 37 of the shaft 26, whereby the said wheels are locked to the shaft 26. The operative parts of the apparatus can thus be regulated for positioning the saws, etc., to cut the work W into any desired lengths with accuracy and speed.

As will be readily understood, the members 25 are also adjustable longitudinally of shaft 26, it being necessary only to release the friction between the shaft and the caps provided by the bolts 35, after which the members 25 can be shifted, the key 36 forming a guide to permit such shifting movement.

In operation, therefore, when it is desired to shift either of the cutting units, it is necessary only to release the bolt 24 for the bracket and the bolts 35 of members 25, after which the units may be adjusted to the proper point and secured in position by tightening of these bolts.

What I claim is:—

1. In a metal cutting machine, a pair of independently driven parallel shafts, a pair of guide members parallel to said shafts, and a sawing unit adjustable in the direction of length of the shafts and said guide members, said unit including a bracket carrying the cutting saw, and gear connections between one of said drive shafts and the saw.

2. In a metal cutting machine, a pair of independently driven parallel shafts, a pair of guide members parallel to said shafts, and a sawing unit adjustable in the direction of length of the shafts and said guide members, said unit including a bracket carrying the cutting saw, and gear connections between one of said drive shafts and the saw, the other of said shafts carrying work conveying mechanism adapted to coöperate with the saw.

3. In a metal cutting machine, a pair of independently driven parallel shafts, a pair of guide members parallel to said shafts, and a sawing unit adjustable in the direction of length of the shafts and said guide members, said unit including a bracket carrying the cutting saw, and gear connections between one of said drive shafts and the saw, the other of said shafts carrying work conveying mechanism including members adjustable in the direction of length of its shaft in correspondence with the adjustment of the unit.

4. The combination with a frame, of brackets on said frame, saws carried by said brackets, bearings on the brackets, gears carried by the bearings, a driving shaft passing through the bearings, means for connecting the gears to the shaft, gears meshing with the first mentioned gears and connected to the saws, and means for shifting the brackets along the length of the frame.

5. The combination with a frame, of brackets on said frame, saws carried by said brackets, bearings on the brackets, gears carried by the bearings, a driving shaft passing through the bearings, means for connecting the gears to the shaft, gears meshing with the first mentioned gears and connected to the saws, and manually controlled means for shifting the brackets along the length of the frame.

6. The combination with a frame, of brackets on said frame, saws carried by said brackets, bearings on the brackets, gears carried by the bearings, a driving shaft passing through the bearings, means for connecting the gears to the shaft, gears meshing with the first mentioned gears and connected to the saws, and manually controlled means for shifting the brackets along the length of the frame, said means comprising a bracket supported gear engaging a rack on the frame.

7. The combination with a frame comprising a bracket support, of a bracket carried thereby and having a geared connection with said support, a gear on the bracket, a saw carried by said bracket, a gear on the saw and meshing with the first named gear, a sleeve connected to the saw gear, a gear driving shaft projecting through and operatively connected to the sleeve, and means for driving said shaft.

8. The combination with a frame having a rack, of a bracket carried by the frame, a gear carried by the bracket and adapted to engage the rack, a drive shaft supported by the bracket, a saw carried by the bracket and geared to said shaft, said rack and its gear being adapted to permit shifting of the bracket in the direction of length of the frame, and a rotary work holder adjacent the saw, said work holder being adapted to support the work against yielding during the sawing operation and comprising a member extending on opposite sides of the saw and adjustable axially to accommodate for the saw adjustment.

In testimony whereof I affix my signature in presence of two witnesses.

LEON W. KILE.

Witnesses:
W. G. DOOLITTLE,
F. E. GAITHER.